US009525249B2

(12) United States Patent
Lo (10) Patent No.: US 9,525,249 B2
(45) Date of Patent: Dec. 20, 2016

(54) CHARGE RECEIVING COUPLER AND POWER ADAPTER FOR ELECTRONIC DEVICE

(71) Applicant: HON HAI PRECISION INDUSTRY CO., LTD., New Taipei (TW)

(72) Inventor: Wu-Jen Lo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 262 days.

(21) Appl. No.: 14/231,915

(22) Filed: Apr. 1, 2014

(65) Prior Publication Data

US 2014/0305782 A1 Oct. 16, 2014

(51) Int. Cl.
*H01H 3/40* (2006.01)
*H01R 13/707* (2006.01)
*H01H 23/24* (2006.01)
*H01H 23/16* (2006.01)
*H02K 7/06* (2006.01)

(52) U.S. Cl.
CPC .......... *H01R 13/707* (2013.01); *H01H 23/24* (2013.01); *H01H 23/16* (2013.01); *H02K 7/06* (2013.01)

(58) Field of Classification Search
CPC ...... H01H 23/24; H01H 19/001; H01H 23/16; H01R 13/707
USPC ............ 200/50.17, 50.21, 61.28–61.37, 339; 74/412 R, 413, 435
See application file for complete search history.

(56) References Cited

U.S. PATENT DOCUMENTS

| 4,570,617 A * | 2/1986 | Baus ................. A61H 7/00 188/65.1 |
| 6,033,256 A | 3/2000 | Odorfer |
| 7,105,762 B1 * | 9/2006 | Lee ................. H01H 23/025 200/339 |
| 2009/0011630 A1 | 1/2009 | Gaidosch et al. |
| 2009/0218205 A1 * | 9/2009 | Blakeman ............ G04F 3/06 200/33 R |
| 2011/0139592 A1 * | 6/2011 | Su ................. H01R 13/506 200/51.02 |
| 2012/0292174 A1 * | 11/2012 | Mah ................. H01H 3/227 200/573 |
| 2012/0300358 A1 * | 11/2012 | Johnson ............ H01H 3/40 361/268 |

(Continued)

FOREIGN PATENT DOCUMENTS

CN 92207368.6 10/1992
CN 1707873 A 12/2005
(Continued)

*Primary Examiner* — Renee S Luebke
*Assistant Examiner* — Ahmed Saeed
(74) *Attorney, Agent, or Firm* — Zhigang Ma (57) ABSTRACT

An electronic device includes a charge receiving coupler. The charge receiving coupler includes a switching assembly and an inserting member. The switching assembly includes a gear transmission shaft, an elastic member, a first transmission wheel, a second transmission wheel fixed to the first transmission wheel, a button gear, and a button fixed to the button gear. The button gear engages with the first transmission wheel. The gear transmission shaft extends through the elastic member, the first transmission wheel and the second transmission wheel in that order. The inserting member defines a receiving groove, and the second transmission wheel is partly received in the receiving groove. The present disclosure further provides a power adapter which is matched with the charge receiving coupler.

19 Claims, 8 Drawing Sheets

(56) References Cited

U.S. PATENT DOCUMENTS

2013/0270092 A1\* 10/2013 Kaneko ............... H02K 7/1853
　　　　　　　　　　　　　　　　　　　　　　200/501

FOREIGN PATENT DOCUMENTS

| CN | 100397720 C | 6/2008 |
| CN | 201194274 Y | 2/2009 |
| CN | 101783467 A | 7/2010 |
| CN | 201528106 U | 7/2010 |
| JP | 2003168528 A | 6/2003 |
| TW | M341338 | 9/2008 |
| TW | 389754 U1 | 10/2010 |
| TW | M402517 U1 | 4/2011 |
| TW | 201228149 A1 | 7/2012 |

\* cited by examiner

CHARGE RECEIVING COUPLER AND POWER ADAPTER FOR ELECTRONIC DEVICE

FIELD

The present disclosure generally relates to electronic devices, and more particularly to a charge receiving coupler and a corresponding power adapter of an electronic device.

BACKGROUND

Many domestic appliances and electronic devices choose an external adapter to provide power. That is, an input plug of the external adapter is inserted into a power socket and an output plug of the external adapter is inserted into an interface of the electronic device to keep the electronic device working. However, the power socket is usually placed in a concealed location. Even if the electronic device is powered off or in standby mode, the electricity consumption still exists.

Generally, the electronic device sets a switch adjacent with the interface of the electronic device to solve the problem of electricity consumption in standby mode. Turn off the switch to reduce the electricity consumption. However, the switch cannot cut off the input current of the adapter and the power of the adapter is nearly 0.5 W (watt).

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, and like reference numerals designate corresponding parts throughout the several views.

DETAILED DESCRIPTION

The disclosure is illustrated by way of example and not by way of limitation in the figures of the accompanying drawings in that like reference numerals indicate similar elements. It should be noted that references to "an" or "one" embodiment in this disclosure are not necessarily to the same embodiment, and such references can mean "at least one."

In the following disclosure, the term "coupled" is defined as connected, whether directly or indirectly through intervening components, and is not necessarily limited to physical connections. The connection can be such that the objects are permanently connected or releasably connected.

Figure 1:
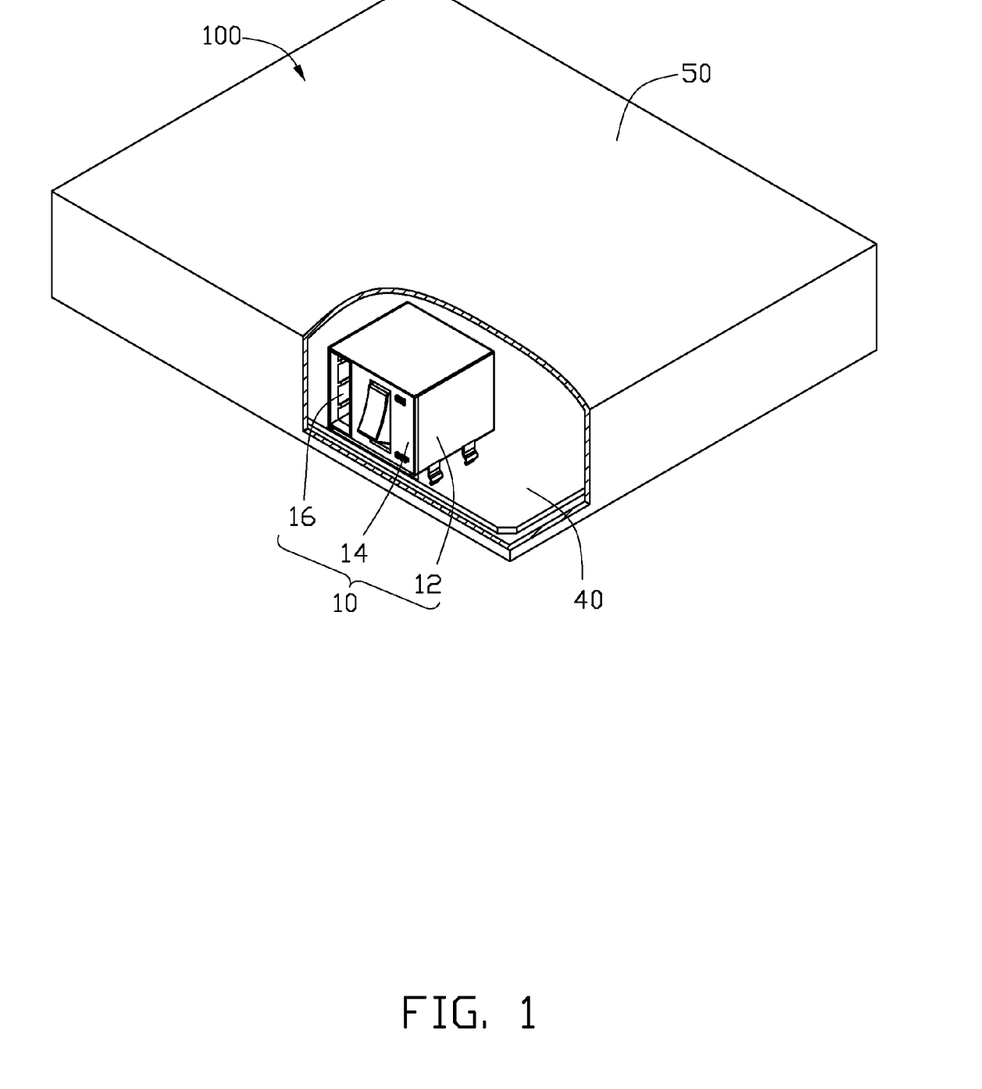
FIG. 1 is an isometric view of an electronic device in accordance with a first exemplary embodiment of the disclosure.

FIG. 1 illustrates that an electronic device 100 can comprise a charge receiving coupler 10, a circuit board 40 and a housing 50. The charge receiving coupler 10 is partly received in the housing 50 and partly located out of the housing 50. The charge receiving coupler 10 electronically couples to the circuit board 40. The electric current flows into the charge receiving coupler 10 and provides power for the circuit board 40 to keep the electronic device 100 working. In the illustrated embodiment, the electronic device 100 can be a device that receives power from an external adapter; as the electronic device can be a Set-top Box or domestic appliances, such as a Modem.

The charge receiving coupler 10 comprises a case 12, a switch assembly 14 and an inserting member 16. The inserting member 16 can be located adjacently to the switch assembly 14, and the switch assembly 14 can be partly received in the inserting member 16. The switch assembly 14 and the inserting member 16 can each be received in the case 12.

Figure 2:
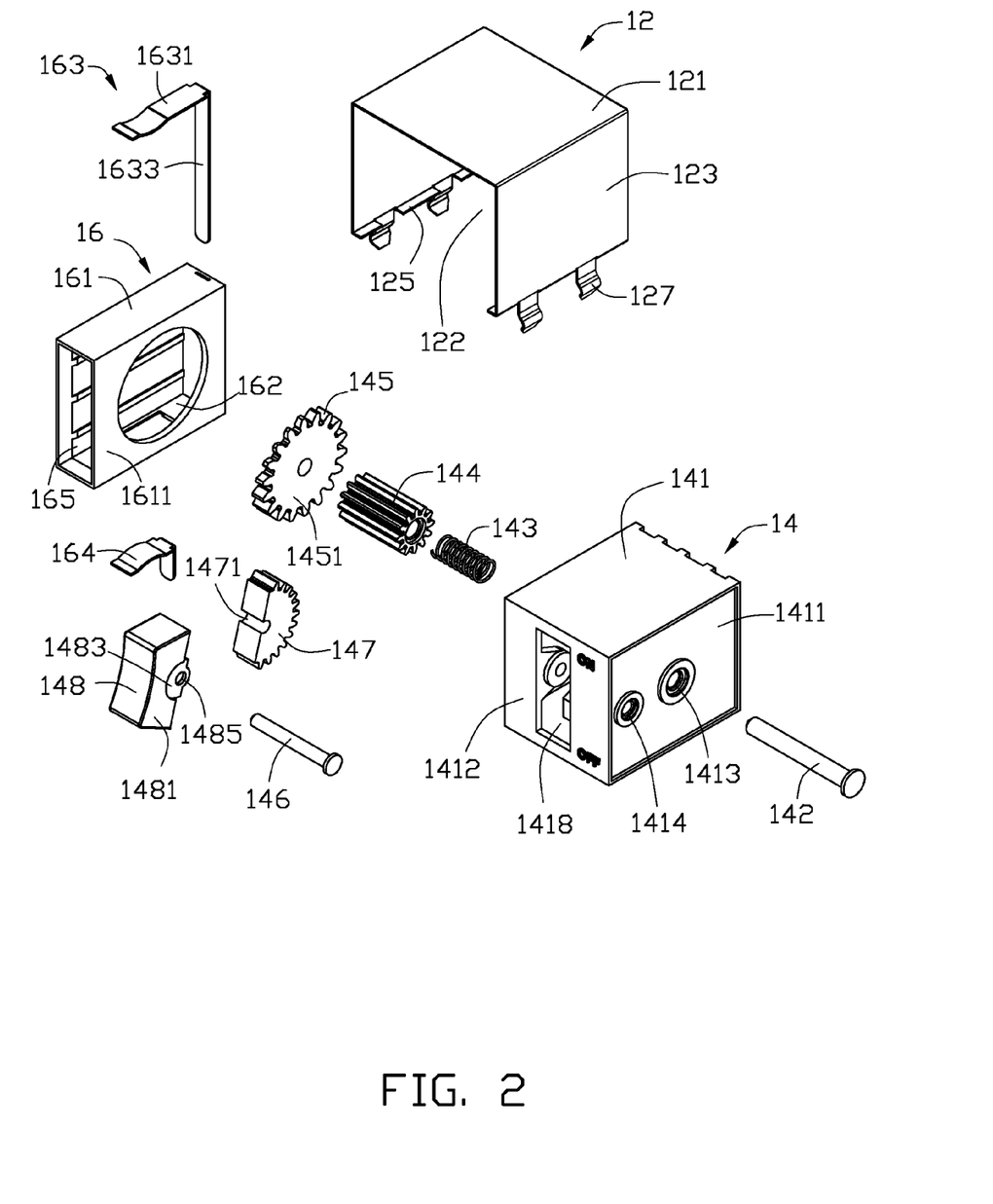
FIG. 2 is an exploded view of the electronic device of FIG. 1.
Figure 3:
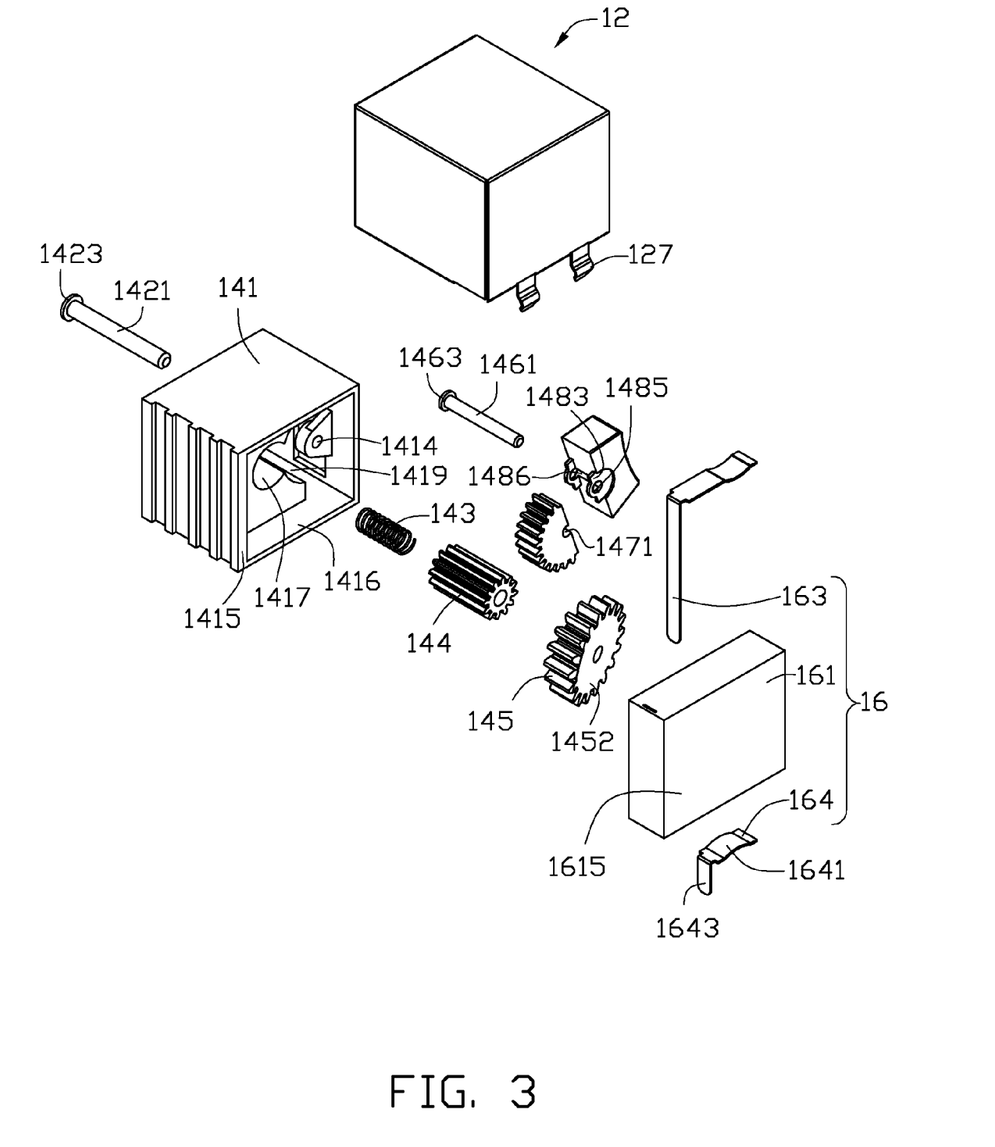
FIG. 3 is an exploded view of a charge receiving coupler of the electronic device of FIG. 2.

FIG. 2 and FIG. 3 illustrate that the case 12 can comprise a main body 121, two first sidewalls 123, a plurality of protrusions 125 and a plurality of prongs 127. One of the first sidewalls 123 extends perpendicularly from the end of the main body 121, and the other one of the first sidewalls 123 extends perpendicularly from the other end of the main body 121. A first receiving space 122 is defined by the first sidewalls 123 and the main body 121. The plurality of protrusions 125 protrude from an end of the first sidewall 123 which is away from the main body 121 in an opposite direction and nearly parallel to the main body 121 to support the switch assembly 14 and the inserting member 16. The plurality of protrusions 125 can be symmetrical. The plurality of prongs 127 extend from the end of the first sidewalls 123 which can be away from the main body 121 and nearly perpendicular to the main body 121 to electronically connect the main body 121 with the circuit board 40 (see FIG. 1). The plurality of prongs 127 can be symmetrical. If the plurality of protrusions 125 extend from the first sidewalls 123 in an opposite direction, the plurality of protrusions 125 form a flat to seal the first sidewalls 123. In the illustrated embodiment, the quantity of the plurality of protrusions 125 is 6 and the quantity of the plurality of prongs 127 is 4. That is, the number of protrusions 125 and the number of prongs 127 can be different. The quantity of the plurality of protrusions 125 is not limited to 6, for example the number of protrusions 125 can be another number, such as 7, 8, 10 and so on. The quantity of the plurality of prongs 127 is not limited to 4, for example the number of protrusions can be another number such as 5, 6, 7 and so on.

The switch assembly 14 can be received in the first receiving space 122 of the case 12 and when the switch assembly is located out of the housing of the electronic device. The switch assembly 14 comprises a first base 141, a gear transmission shaft 142, a resilient element 143, a first driving wheel 144, a second driving wheel 145, a button transmission shaft 146, a button gear 147 and a button 148. The gear transmission shaft 142 can pass through the first base 141. The gear transmission shaft 142 can extend through the resilient element 143, the first driving wheel 144 and the second driving wheel 145. The gear transmission shaft 142 can be received in the first base 141. The second driving wheel 145 can be fixed on the first driving wheel 144. The resilient element 143 can be arranged between an inner wall of the first base 141 and the first driving wheel 144. The button transmission shaft 146 passes through the button gear 147 and can be mounted on the first base 141. The button gear 147 can engage the first driving wheel 144. The button 148 can be mounted on the first base 141 and rotate relative to the first base 141 via the button transmission shaft 146, which can be fixed on the button gear 147. When the button 148 is pushed, the button 148 drives the button gear 147 to rotate, and the first driving wheel 144 rotates around the gear transmission shaft 142 and drives the second driving wheel 145 to rotate. In the illustrated embodiment, the resilient element 143 is a spring. That is, the resilient element 143 can be an elastic sleeve and so on.

Figure 4:
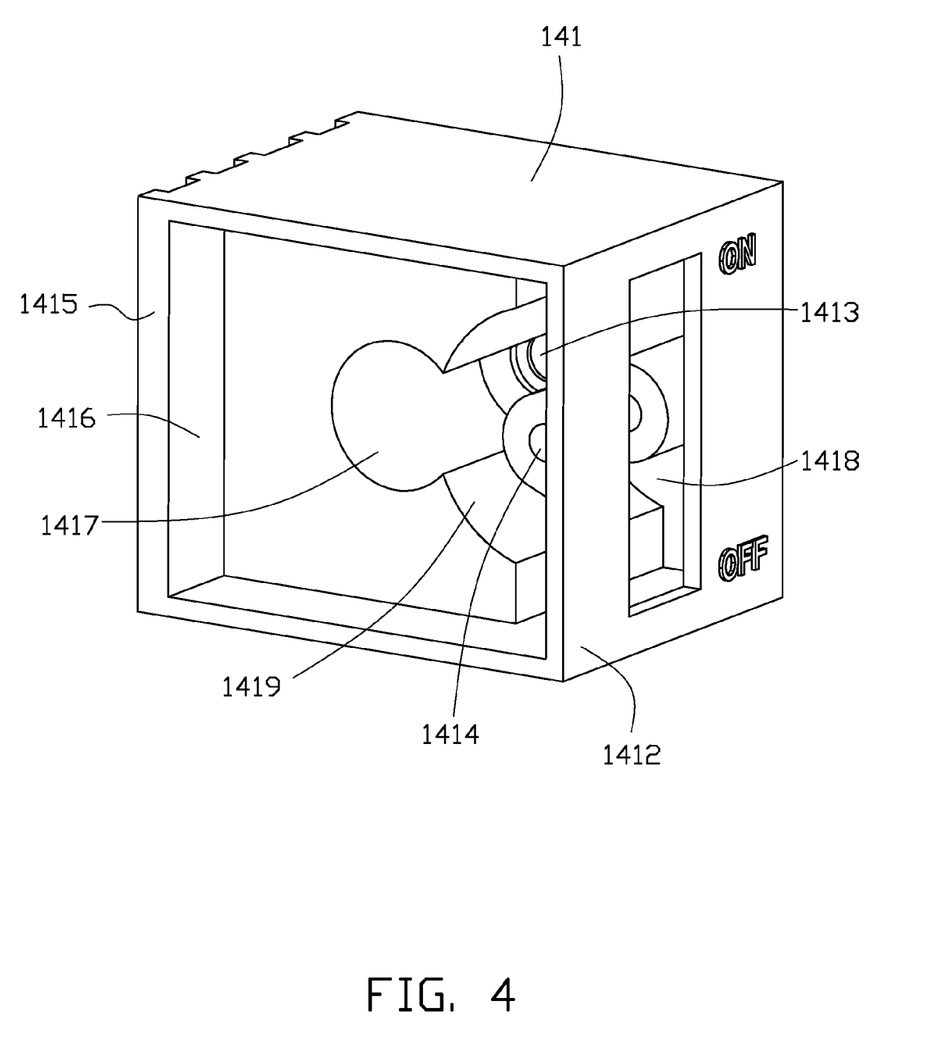
FIG. 4 is a partial enlarged view of the charge receiving coupler of FIG. 3.

FIG. 2, FIG. 3, and FIG. 4 illustrate that the shape of the first base 141 can be a rectangle that is received in the first receiving space 122 of the case 12. The first base 141 comprises a first surface 1411, a second surface 1415 parallel and opposite to the first surface 1411 and a second sidewall 1412. The shape of the first surface 1411, the second surface 1415 and the second sidewall 1412 can be a rectangle, as illustrated. The second sidewall 1412 can connect the first surface 1411 to the second surface 1415. A first shafting hole 1413 can traverse from the middle of the first surface 1411 to the second surface 1415 of the first base 141. A second shafting hole 1414 can traverse from the edge of the first surface 1411 to the second surface 1415. The center axis of the first shafting hole 1413 and the second shafting hole 1414 can be parallel to each other. The first base 141 can define a second receiving space 1416 from the second surface 1415 to the first surface 1411. The second receiving space 1416 can define a first receiving groove 1417 and a second receiving groove 1419 on an inner wall of the first surface 1411. The first receiving groove 1417 communicates with the second receiving groove 1419. The first receiving groove 1417 communicates with the first shafting hole 1413 and the second receiving groove 1419 communicates with the second shafting hole 1414. The second shafting hole 1414 defines an installing hole 1418 on the second sidewall 1412 and the installing hole 1418 communicates with the second receiving groove 1419. A sign of "ON" and a sign of "OFF" are located on a same side of the second sidewall 1412 of the first base 141 and perpendicular to the first base 141 which is near to the installing hole 1418.

The gear transmission shaft 142 inserts into the first base 141 via the first shafting hole 1413 and is received in the second receiving space 1416 and the first receiving groove 1417. The gear transmission shaft 142 comprises a first main body 1421 and the first fixing end 1423 protruding from one end of the first main body 1421. The first main body 1421 can be in rod shape and received in the first receiving groove 1417 of the second receiving space 1416. The first fixing end 1423 can be a substantially circular shape and the diameter of the first fixing end 1423 can be greater than the diameter of the first shafting hole 1413, and the first fixing end 1423 can be retained to the first shafting hole 1413.

The first driving wheel 144 can be a substantially hollow cyliner shape, the surface can be in gear shape thereof. The first driving wheel 144 can be rotatably inserted into the first main body 1421 of the gear transmission shaft 142 and received in the first receiving groove 1417. The rotation axis of the first driving wheel 144 can coincide with the center axis of the first shafting hole 1413.

The second driving wheel 145 can be a substanially hollow cyliner shape fixing to the first driving wheel 144 and can be rotatably inserted into the first main body 1421 of the gear transmission shaft 142 and received in the second receiving space 1416 of the first base 141. The section of the second driving wheel 145 along the direction of perpendicular to the first surface 1411 of the first base 141 is right-angle trapezoid. The rotation axis of the second driving wheel 145 coincides with the center axis of the first shafting hole 1413. The second driving wheel 145 comprises a first end 1451 adjacent with the first driving wheel 144 and a second end 1452 opposite to the first end 1451. The first end 1451 can be flat and the second end 1452 can be an inclined plane. A thickness of the second driving wheel 145 along the direction of axis can increase gradually. In the embodiment, the second driving wheel 145 can be a gear.

The button transmission shaft 146 can insert into the second shafting hole 1414 and can be received in the second receiving groove 1419 of the first base 141. The shape of the button transmission shaft 146 and the gear transmission shaft 142 can be nearly same. The button transmission shaft 146 comprises a second main body 1461 and a second fixing end 1463 protruding from one end of the second main body 1461. The second main body 1461 can be in rod shape and received in the second receiving groove 1419 of the second receiving space 1416. The second fixing end 1463 can be in circular shape and the diameter of the second fixing end 1463 is greater than the diameter of the second shafting hole 1414, and the second fixing end 1463 can be retained to the second shafting hole 1414.

The button gear 147 can be in cylinder shape communicating with the first driving wheel 144 and can be received in the second receiving groove 1419 of the first base 141. The rotation axis of the button gear 147 coincides with the center axis of the second shafting hole 1414. A first recess 1471 can be defined on one the side of the button gear 147. The section of the first recess 1471 along the direction of perpendicular to axis of the button gear 147 can be circular arc to fix on the second main body 1461 of the button transmission shaft 146.

The button 148 can be substantially rectangular in shape. The button 148 is rotataly mounted on the first base 141 via the installing hole 1418 and fixed on the button gear 147 and partly out of the housing 50. The button 148 comprises a first body 1481 and a pair of convex lug 1483 extended from two opposite side of the first body 1481 of the button 148. Each convex lug 1483 can define a fixing hole 1485 and the center axis of the fixing hole 1485 can coincide with the center axis of second shafting hole 1414. The diameter of the fixing hole 1485 can be equal to the diameter of the first recess 1471. A second recess 1486 can be defined on the side of the button 148. The second recess 1486 can correspond to the first recess 1471 of the button gear 147 and communicates with the fixing hole 1485. The button transmission shaft 146 can pass through the fixing hole 1485, the first recess 1471 and the second recess 1486. The button transmission shaft 146 can be inserted into the second shafting hole 1414, then inserted into the fixing hole 1485 of one of the convex lugs 1483, then inserted into the first recess 1471 and the second recess 1486, and then out of the fixing hole 1485 of the other one of the convex lugs 1483. That is, the button gear 147 can be partly received between the pair of convex lugs 1483 and connects the button 148 to the button gear 147.

The inserting member 16 can be in a rectangular shape and comprises a third body 161, a first electrode 163 and a second electrode 164. The first electrode 163 and the second electrode 164 can be partly received in the third body 161 and partly out of the third body 161. The third body 161 comprises a third surface 1611 and a fourth surface 1615 parallel to the third surface 1611. A receiving hole 162 can be defined on the third surface 1611 of the third body 161 and used to partly receive the second driving wheel 145. A slot 165 can be defined on the side of the third body 161 and communicates with the receiving hole 162. The shape of the first electrode 163 can be substantially the same shape as the second electrode 164 that a "L" shape and both of that can be received in the slot 165. The first electrode 163 comprises a first conducting portion 1631 and a first contacting portion 1633 extending from the first conducting portion 1631, the first contacting portion 1633 is conducting thereof. The first conducting portion 1631 can be fixed on one side of the slot 165, and the contacting portion 1633 can be partly received in the slot 165 and partly out of the slot 165. The shape of the first electrode 163 can be substantially the same as the second electrode 164. The second electrode 164 comprises a second conducting portion 1641 and a second contacting portion 1643. The second conducting portion 1641 can be fixed on the other side of the slot 165 away from the first conducting portion 1631 of the first electrode 163 and the second contacting portion 1643 is out of the third body 161 of the slot 165. The first contacting portion 1633 of the first electrode 163 and the second contacting portion 1643 of the second electrode 164 electronically connect to the circuit board 40 (see FIG. 1) and other electronic elements, respectively.

When the charge receiving coupler 10 is assembled, the gear transmission shaft 142 can be inserted into the first base 141 via the first shafting hole 1413. The resilient element 143, the first driving wheel 144 and the second driving wheel 145 can be respectively installed onto the gear transmission shaft 142 and can be received in the first base 141. The button gear 147 can be received in the second receiving groove 1419 and engage with the first driving wheel 144. The button 148 can be mounted on the first base 141. The button transmission shaft 146 can pass through the fixing hole 1485 of the button 148 and the button gear 147. The first electrode 163 and the second electrode 164 respectively can be fixed on the third body 161 of the inserting member. When the second driving wheel 145 is received in the slot 165 via the receiving hole 162 of the inserting member, the switch assembly 14 can be retained to the inserting member 16 and the second end 1452 of the second driving wheel 145 forms a space (shown but unnumbered in FIG. 1). Because the second end 1452 is the inclined face, the distance between the side of the third body 161 of the inserting member adjacent with the second end 1452 and the second end 1452 of the second driving wheel 145 can be reduced gradually along the direction of insertion till the switch assembly and the inserting member are received in the case to fix the switch assembly on the inserting member.

Figure 5:
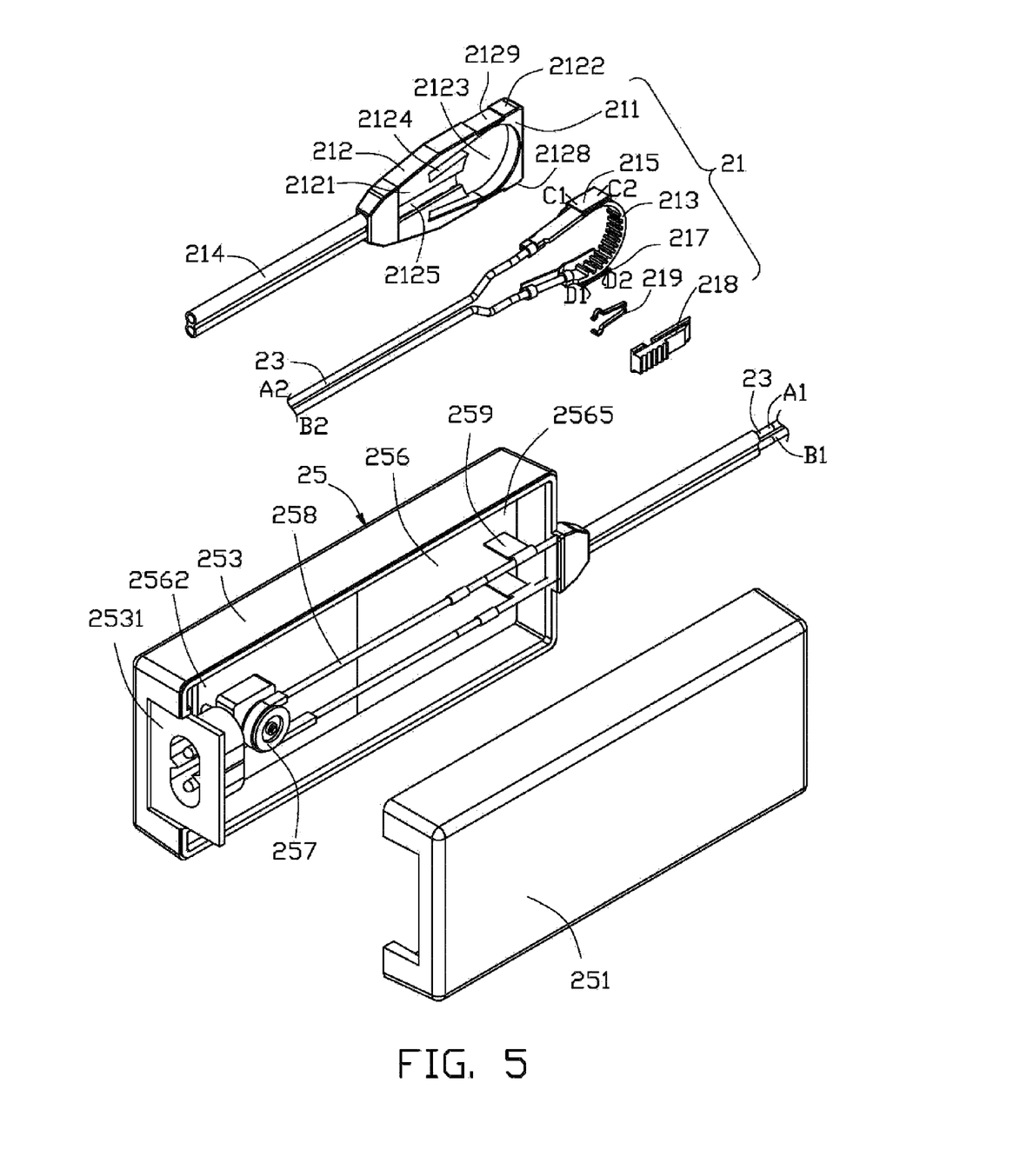
FIG. 5 is an exploded view of a power adapter of the electronic device of FIG. 2.
Figure 6:
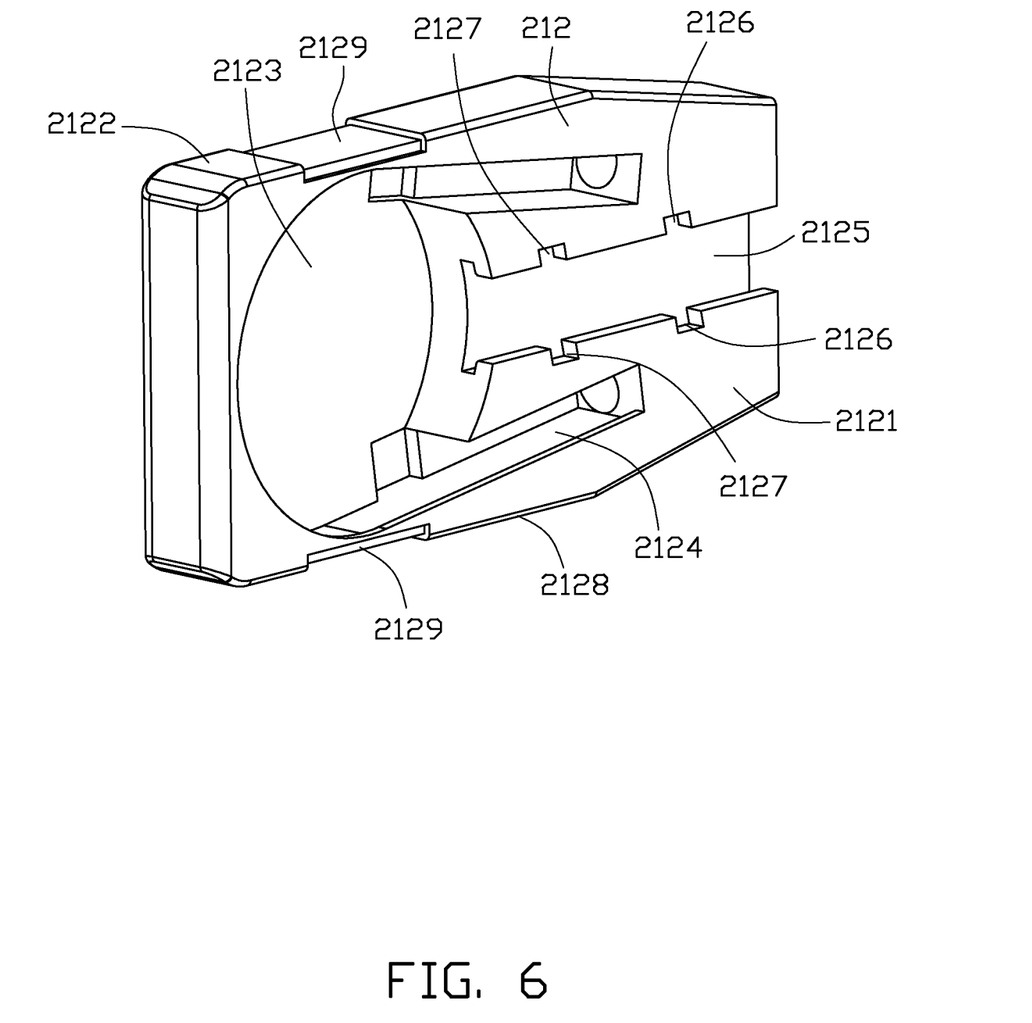
FIG. 6 is a partial enlarged view of the power adapter of FIG. 5.

FIG. 5 and FIG. 6 illustrate that the power adapter 20 comprises a plug 21, two wires 23 and a body 25. One of the wires 23 comprises an end A1 and an end A2, and the other one of the wires 23 comprises an end B1 and an end B2. The end A2 and the end B2 are received in the plug 21, respectively. The end A1 and the end B1 are received in the body 25, respectively. The plug 21 comprises a second base 211, a first transmission belt 213, a first conducting film 215, a second conducting film 217, a movable element 218 and an elastic element 219. The first transmission belt 213, the first conducting film 215, the second conducting film 217 and the movable element 218 can be received in the second base 211. The first transmission belt 213 connects the end A2 and the end B2 respectively. The first conducting film 215 comprises an end C1 and an end C2, and the second conducting film 217 comprises an end D1 and an end D2. The end of the first conducting film 215 can be sleeved and electronically connects the end A2 of the wire 23. The end C2 of the first conducting film 215 is out of the second base 211. The end D1 of the second conducting film 217 can be sleeved and electronically connects the end B2 of the wire 23. The end D2 of the second conducting film 27 is out of the second base 211.

The second base 211 comprises a second body 212 and an insulation sleeve 214 extending from one end of the second body 212. The insulation sleeve 214 can provide for insulation from the surrounding environment and be used to connect the second body 212 to the body 25. The second body 212 can be substantially rectangular in shape corresponding to the slot 165. The second body 212 comprises a fitting surface 2121, a first profile 2122 and a second profile 2128 located opposite to the first profile 2122. The fitting surface 2121 connects the first profile 2122 to the second profile 2128. A first groove 2123 and a third groove 2125 are defined on the fitting surface 2121 of the second body 212. The first groove 2123 can be a circular shape and locates adjacent with the end of the second body 212 and away from the insulation sleeve 214 thereof. The third groove 2125 can be a rectangular shape and communicates with the first groove 2123. Two installing grooves 2129 can be defined on the first profile 2122 and the second profile 2128, respectively. A second groove 2124 can be an arc shape and defined adjacently with the insulation sleeve 214. The second groove 2124 can be divided into two parts by the third groove 2125 and communicates with the first groove 2123. Each side of the third groove 2125 comprises a plurality of first slots 2126 and a plurality of second slots 2127. The first slots 2126 communicate with the third groove 2125 and adjacent to the insulation sleeve 214. The second slots 2127 communicate with the third groove 2125 and are located away from the insulation sleeve 214.

The first transmission belt 213 can be received in the second groove 2124 and connects the end A2 and end B2 of the wire 23. In the embodiment, the first transmission belt 213 can be a rack.

The second transmission film 215 is partly received in the second groove 2124 and out of the second groove 2124. The end C1 of the first conducting film 215 connects the end A2 of the wires 23, and the end C2 of the first conducting film 215 is out of the second groove 2124 and received in the installing groove 2129 of the first profile 2122 to electronically connect to the first conducting portion 1631 of the first electrode 163. The shape of the second conducting film 217 can be substantially the same as the first conducting film 215. The second conducting film 217 can be partly received in the second groove 2124 and partly out of the second groove 2124. The end D1 of the second conducting film 217 can connect the other wire 23, and the end D2 of the second conducting film 217 is out of the second groove 2124 and received in the installing groove 2129 of the second profile 2128 to electronically connect to the second conducting portion 1641 of the second electrode 164.

The movable element 218 can be received in the third groove 2125. Because the third groove 2125 communicates with the first groove 2123, the movable element 218 move from the third groove 2125 to the first groove 2123 under the external force. The elastic element 219 can be substantially in "V" shape and partly received in the movable element 218, two ends of which are retained to the first slots 2126 respectively to keep the movable element 218 and the second body 212 of the second base 211 to remain relatively stable. When the movable element 218 moves from the third groove 2125 to the first groove 2123, the ends of the elastic element 219 of the plug 21 separate from the first slots 2126 and move with the movable element 218 till the second slots 2127, and the ends of the elastic element 219 retain to the second slots 2127 to stop the movable element 218 moving.

The body 25 can be substantially rectangular in shape and comprises a first cover 251, a second cover 253, a circuit unit 256, a rotating switch 257 and a pair of conducting members 259. The circuit unit 256, the rotating switch 257, the second transmission belt 258 and the pair of conducting members 259 can be received in the second cover 253. The first cover 251 can be coupled with the second cover 253. The rotating switch 257 can be mounted on the circuit unit 256. The second transmission belt 258 wraps around the rotating switch 257, and one end of the transmission belt 258 can be fixed on the end B2 of the wires 23 away from the plug 21 thereof and the other one end of the transmission belt 258 fixes on the end B1 of the wires 23 away from the plug 21 thereof. One end of each conducting member 259 can be respectively fixed on the circuit unit 256 and the other end of each conducting member 259 can be respectively wrapped on the wires.

One end of the second cover 253 defines an inserting slot 2531 used to connected with the power source and the other end of the second cover 253 connects with the insulation sleeve 214. The circuit unit 256 comprises an input end 2562, an output end 2565 and a transformer (shown but unnumbered in FIG. 5). The input end 2562 electronically connects the external power and the output end 2565 can be used to transfer the power to the body 25. The alternating current transfers from the input end 2562 of the circuit unit 256 to the transformer to transform alternating current to direct current and the direct current flows out of the output end 2565 of the circuit unit 256.

The rotating switch 257 can be mounted on the input end 2562 of the circuit unit 256 to control the circuit unit 256 on and off. The second transmission belt 258 can wrap around the rotating switch 257 and one end of the second transmission belt 258 connects to one of the wires 23 and the other end connects the other one of the wires 23. One end of each conducting member 259 respectively wraps around the wires 23 and the other end of conducting member 259 electronically connects the output end 2565 of the circuit unit 256 to transform the power source to the wires 23.

In assembly the power adapter 20, the first transmission belt 213, the first conducting film 215, the second conducting film 217 and the movable member 218 can be mounted on the second body 212 of the second base 211 of the plug 21, respectively. Cause the first conducting film 215 and the second conducting film 217 are actively sleed on the wires 23 and the transmission belt 213. The end C1 of the first conducting film 215 and the end D1 of the second conducting film 217 can wrap around the end A2 and the end B2 of the wires 23, respectively. The end A2 of the wire 23 can connect the ends of the first transmission belt 213. The wires can be inserted into the insulation sleeve 214 and the end A1 of the wire 23 can connect to the second transmission belt 258. That is, the first transmission belt 213, the wires 23 and the second transmission belt 258 cooperatively connect with each other to form a loop. The circuit unit 256 and the rotating switch can be mounted on the second cover 253, respectively. The second transmission belt 258 can wraps around the rotating switch 257. One end of each conducting member 259 can respectively wraps around the wires 23 and the other end of conducting member 259 electronically connects to the output end 2565 of the circuit unit 256. The first cover 251 cooperatively couples with the second cover 253. When the first transmission belt 213 rotates, the second transmission belt 258 rotates with the first transmission belt 213 to turn on or off the rotating switch to control the circuit unit 256 power on or off.

Figure 7:
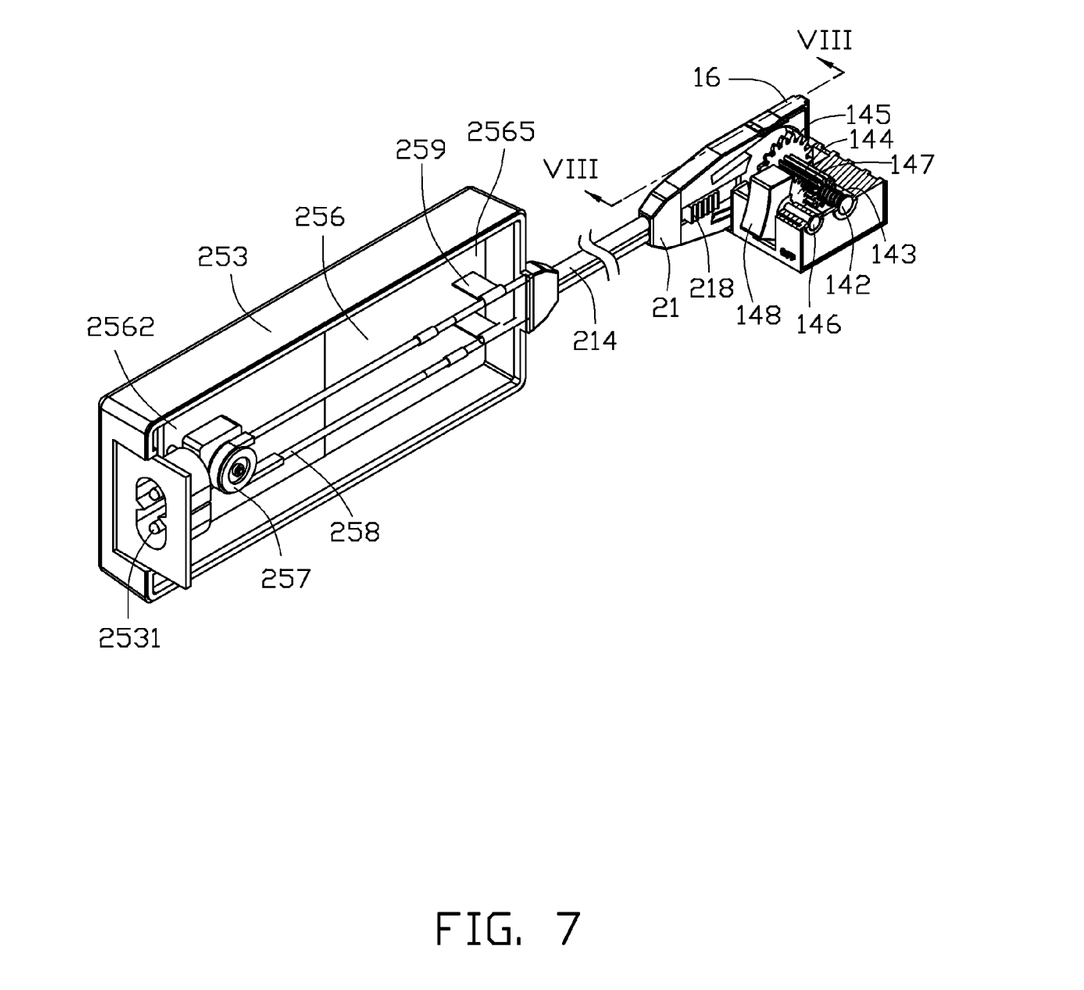
FIG. 7 is an isometric view of a power adapter having an end coupled to the charging mechanism.
Figure 8:
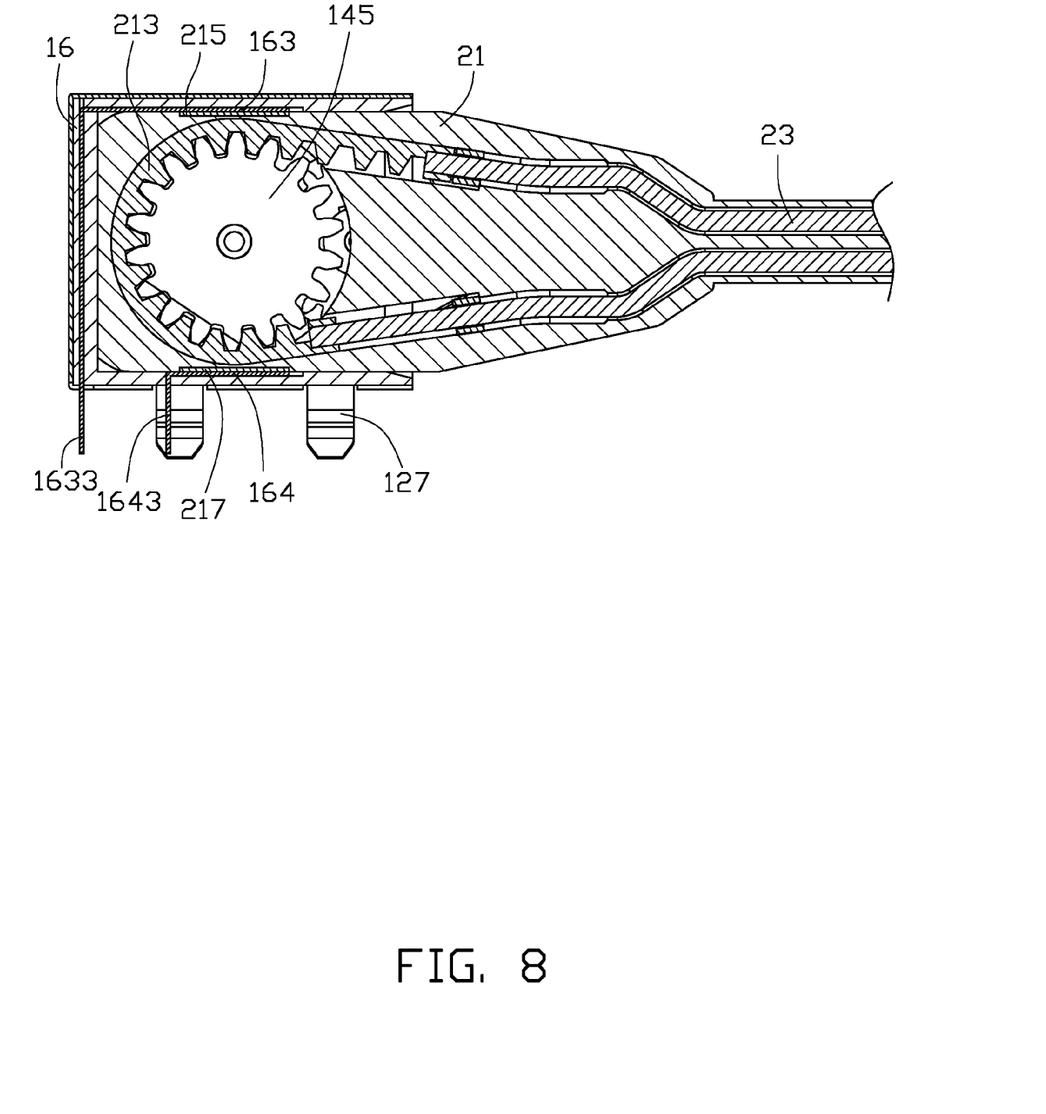
FIG. 8 is a part of a cross-sectional view taken along line VIII-VIII of the charge receiving coupler coupled to the power adapter of FIG. 7.

FIG. 7 and FIG. 8 illustrate that the plug 21 of the power adapter inserts into the slot 165 of the charge receiving coupler of the electronic device. When the plug 21 inserts into the inserting member 16, the second body of the plug 21 produces extrusion force to the second driving wheel 145. When second driving wheel 145 moves to the switch assembly 14 and release the resilient element 143 (see FIG. 2). When the insertion of the plug 21 continues, the first groove of the plug 21 contacts with second driving wheel 145 that the extrusion force disappear and the resilient element 143 returns to deformation. That is, the second driving wheel 145 can be partly received in the first groove of the plug 21 and the first transmission belt 213 wraps around the second driving wheel 145. In the illustrated embodiment, the first transmission belt 213 can engage with the second driving wheel 145. The first conducting film 215 of the plug 21 can electronically connect the first conducting portion 1631 of the first electrode 163 and the second conducting film 217 of the plug 21 electronically connects the second conducting portion 1641 of the second electrode 164.

When the button is pushed toward the sign "ON", the button 148 drives the button gear 147 to rotate via the button transmission shaft 146. Because the button gear 147 engages with the first driving wheel 144, the button gear 147 drives the first driving wheel 144 to rotate and the first driving wheel 144 drives the second driving wheel 145 to rotate thereby. Because the second driving wheel 145 engages with the first transmission belt 213, the second driving wheel 145 drives the first transmission belt 213 to rotate. The first transmission belt 213, the wires 23 and the second transmission belt 258 can cooperatively connect with each other to form a circle that drives the second transmission belt 258 to rotate. The second transmission belt 258 can drive the rotating switch 257 to the status of conduction.

When the button 148 is pushed toward the sign "OFF", the button 148 drives the button gear 147 to reconversion via the button transmission shaft 146. The button gear 147 drives the first driving wheel 144 to reconversion and the first driving wheel 144 drives second driving wheel 145 to reconversion via the gear transmission shaft 142. The second driving wheel 145 drives the wires 23 and the second transmission belt 258 to reconversion via the first transmission belt 213. The second transmission belt 258 drives the rotating switch 257 to the status of close. The movable element 218 moves in the direction of the slot 165 to produce extrusion force to the second driving wheel 145. The second driving wheel 145 can move towards the switch assembly 14. When the first transmission belt 213 and the second driving wheel 145 are not meshed with each other, the plug 21 can be pulled out of the slot 165. The elastic element 219 of the plug 21 can be received in the second slots 2127 to prevent the movable element 218 to move towards the third groove 2125.

In the illustrated embodiment, the rotating switch 27 is mounted on the input end 2562 of the circuit unit 256 of the power adapter 20 and the second transmission belt 258 wraps on the rotating switch 257. The first transmission belt 213, the wires 23 and the second transmission belt 258 can cooperatively connect each other to form a loop. The charge receiving coupler can be installed in the electronic device. When the plug 21 is inserted into the charge receiving coupler, the first transmission belt 213 engages with the second driving wheel 145. The button 148 drives the button gear 147, the first driving wheel 144 and the second driving wheel 145 to rotate, and the second transmission belt 258 is driven to rotate, and thereby to control the rotating switch 257 on and off. In summary, the button 148 of the charge receiving coupler can be used to turn on or turn off the power source of the body 25 of the power adapter, which reduces energy consumption and is convenient for operation.

In other embodiments, the button transmission shaft 146 can be canceled if the button 148 is fixed on the button gear 147 or when push the button 148 by external force, the button gear 147 is driven to rotate.

While various embodiments of the present disclosure have been particularly shown and described, it will be understood by those skilled in the art that various changes in form and details may be made therein without departing from the spirit and scope of the present invention as defined by the appended claims. For example, the second end 1452 of the second driving wheel 145 can be a flat or other shapes so that the thickness between the second end 1452 and the slot 165 can be reduced gradually along the direction of insertion or the resilient element 143 can be compressed and released when the plug 21 is inserted or pulled out of the slot 165.

What is claimed is:

1. A charge receiving coupler, comprising:
a switch assembly comprising a gear transmission shaft, a resilient element, a first driving wheel, a second driving wheel fixed to the first driving wheel, a button gear engaged with the first driving wheel, and a button fixed to the button gear; and
an inserting member adjacent to the switch assembly defining a receiving groove and the second driving wheel partly received in the receiving groove;
wherein the gear transmission shaft extends through the resilient element, the first driving wheel and the second driving wheel;
wherein a distance between the inserting member and a contacting surface of the second driving wheel is reduced gradually along the direction of insertion.

2. The charge receiving coupler of claim 1, wherein the switch assembly further comprises a first base; wherein the resilient element, the first driving wheel and the button gear are received in the first base, and the second driving wheel partly received in the first base and the button fixed on the first base.

3. The charge receiving coupler of claim 2, wherein the resilient element is arranged between an inner wall of the first base and the first driving wheel.

4. The charge receiving coupler of claim 1, wherein the second driving wheel is a gear and comprises a first end and a second end opposite to the first end.

5. The charge receiving coupler of claim 4, wherein the first end is a flat and engages with the first driving wheel, the second end is an inclined plane that causes the distance between the inserting member and the contacting surface of the second driving wheel becomes smaller gradually along the direction of insertion.

6. The charge receiving coupler of claim 1, further comprising a case, wherein the switch assembly and the inserting member are received in the case, and the switch assembly is mounted on the inserting member.

7. The charge receiving coupler of claim 1, wherein the button comprises a first body and a pair of convex lugs extended from two opposite sides of the first body of the button and each convex lug defines a fixing hole, and the button gear comprises a first recess perpendicular to the button gear and a second recess located opposite to the first recess.

8. The charge receiving coupler of claim 7, wherein the switch assembly further comprises a button transmission shaft extending through the fixing hole, the first recess and the second recess, and the button gear partly received between the convex lugs.

9. A power adapter, comprising:
a body comprising a first cover, a second cover assembled together and a circuit unit mounted on the second cover, and the circuit unit used to transform alternating current to direct current;
a plug comprising a first transmission belt, a rotating switch located on an input end of the circuit unit to control the circuit unit on and off, and a second transmission belt wrapping around the rotating switch; and
two wires, one end of each wire connecting with the first transmission belt and an other end of each wire connecting with the second transmission belt;
wherein when the first transmission belt rotates, the second transmission belt rotates with the first transmission belt to turn on or off the rotating switch to control the circuit unit power on or off.

10. The power adapter of claim 9, wherein the first transmission belt is a rack.

11. The power adapter of claim 9, wherein the plug further comprises a second base and the first transmission belt is received in the second base.

12. The power adapter of claim 11, wherein the second base comprises a second body comprising a first profile and a second profile located opposite to the first profile, and two installing grooves are defined on the first profile and the second profile.

13. The power adapter of claim 9, further comprising a pair of conducting members, wherein one end of the conducting member respectively engages with the two wires and an other end of the conducting member respectively is fixed on the output end of the circuit unit.

14. The power adapter of claim 12, wherein the second base further comprises an insulation sleeve connecting the second body of the second base with the body of the power adapter and comprises a fitting surface connecting the first profile to the second profile, a first groove is partly received in a second driving wheel extended from the fitting surface of the second base, a second groove is located adjacent to the insulation sleeve and communicates with the first groove, and the first transmission belt is partly received in the first groove and is partly received in the second groove; wherein the wires are partly received in the fixing sleeve, the second groove of the second base and the body of the power adapter.

15. The power adapter of claim 14, wherein a third groove is defined in the fixing surface and communicates with the first groove, one side of the third groove comprises a plurality of first slots and a plurality of second slots, and an other side of the third groove comprises a plurality of first slots and a plurality of second slots on corresponding location.

16. The power adapter of the claim 9, wherein the plug further comprises a movable element received in the third groove and an elastic element partly received in the movable element, two ends of the plug are retained to the first slots respectively to keep the movable element and the second body of the second base to remain relatively stable; when the movable element moves from the third groove to the first groove, the ends of the elastic element of the plug separate from the first slots and move with the movable element till the second slots, and the ends of the elastic element retain to the second slots to stop the movable element moving.

17. An electronic device, comprising:
a circuit board;
a charge receiving coupler located on the circuit board, comprising a switch assembly comprising a gear transmission shaft, a resilient element, a first driving wheel, a second driving wheel fixed on the first driving wheel, a button gear engaged with the first driving wheel, and a button fixed on the button gear, and the charge receiving coupler comprising an inserting member adjacent to the switch assembly comprising a third body, a first electrode and a second electrode, the first electrode and the second electrode mounted on the third body and electrically connected to the circuit board, the inserting member further defining a receiving groove and the second driving wheel partly received in the receiving groove;
wherein the gear transmission shaft extends through the resilient element, the first driving wheel and the second driving wheel, and the first electrode and the second electrode are partly received in the receiving groove;
a power adapter, comprising a body comprising a first cover, a second cover assembly together and a circuit unit mounted on the second cover, and the circuit unit used to transform alternating current to direct current, the power adapter comprising a plug, wherein the plug comprises a first transmission belt, a rotating switch located on the input end of the circuit unit to control the circuit unit on and off, and a second transmission belt wraps around the rotating switch; and
two wires, one end of the each wires connecting to the first transmission belt and the other end of the each wire connecting to the second transmission belt;
wherein the first transmission belt engaged with the second driving wheel;
wherein when the first transmission belt rotates, the second transmission belt rotates with the first transmission belt to turn on or off the rotating switch to control the circuit unit power on or off.

18. The electronic device of claim 17, wherein the plug further comprises a second base and the first transmission belt received in the second base; wherein the second base comprises a second body comprising a first profile and a second profile located opposite to the first profile, and two installing grooves defined on the first profile and the second profile, a conducting members respectively engages with the wires and the other end of the conducting member respectively fixed on the output end of the circuit unit.

19. The electronic device of claim 17, wherein when the plug of the power adapter inserts into the charge receiving coupler, the first transmission belt engages with the second driving wheel, and when push the button to rotate the button gear, the first driving wheel and the second driving wheel, with which the second transmission belt rotates to turn on or off the rotating switch to control the circuit unit power on or off.

* * * * *